Jan. 6, 1942.  L. SCRUGGS  2,269,291
CHUCK FOR FRACTIONAL HORSEPOWER ELECTRIC MOTORS
Filed April 5, 1940
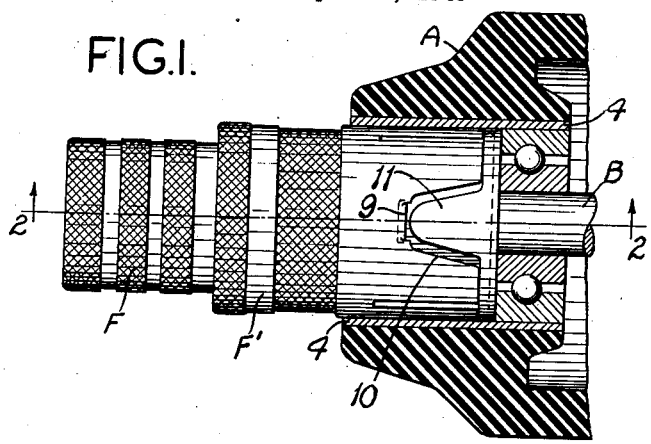
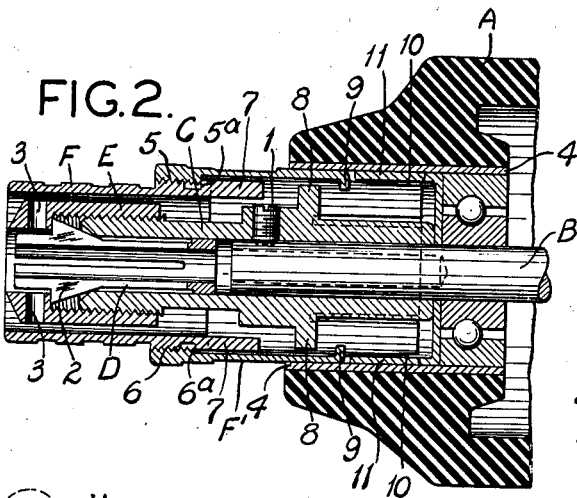
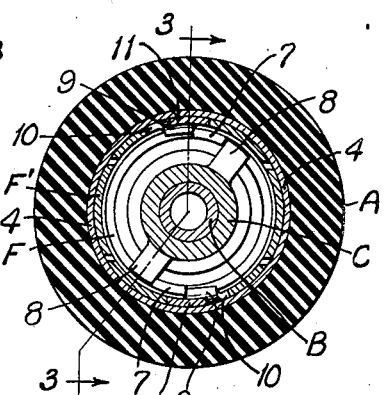
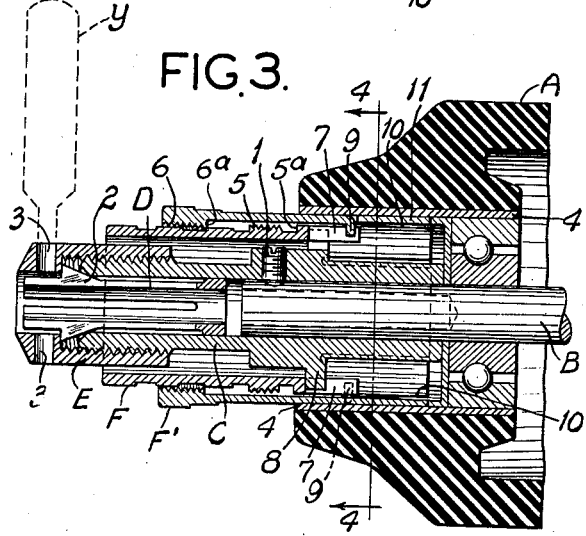
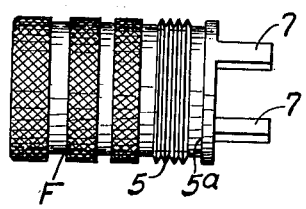
INVENTOR;
LOYD SCRUGGS
BY
ATTORNEY Patented Jan. 6, 1942

2,269,291

UNITED STATES PATENT OFFICE 2,269,291

CHUCK FOR FRACTIONAL HORSEPOWER ELECTRIC MOTORS

Loyd Scruggs, University City, Mo.

Application April 5, 1940, Serial No. 327,955

4 Claims. (Cl. 279—52)

This invention relates to chucks or tool holders for fractional horse power electric motors, and other portable tool operating devices of the kind that comprise a housing intended to be grasped by the hand of the user, and a drive shaft in said housing provided with a chuck that carries a tool which is held in engagement with the work and guided over same by manipulating said housing.

In my prior U. S. Patent No. 2,153,847, dated April 11, 1939, I have illustrated a fractional horse power motor of the general type referred to, whose tool chuck has combined with same, a finger grip or shield that performs the dual function of: (a) a non-rotatable grip for the user's fingers located in sufficiently close proximity to the tool to insure accurate guiding, control and manipulation of the tool; and (b) a means that is used to hold the jaw carrying member of the chuck against rotary movement when the jaw expanding device of the chuck is turned or rotated to contract or expand the tool gripping jaws of the chuck. In the embodiment of the invention illustrated in said patent, the finger grip or shield above referred to consists of a relatively long sleeve or tubular-shaped member slidingly mounted in the front end portion of the motor housing in such a way that it is adapted to be extended or moved outwardly relatively to said housing, so as to cover and protect the jaw actuating device of the chuck, and thus form a non-rotatable finger grip located in close proximity to the tool clamped by the jaws of the chuck, and adapted to be retracted or moved inwardly relatively to the motor housing, so as to expose said jaw actuating device and also cause a means on said sleeve to be arranged in a position wherein it will prevent the jaw-carrying member of the chuck from turning when the jaw actuating device is being rotated in the operation of installing or removing a tool.

My present invention consists of a tool chuck, or a combined chuck and finger grip for fractional horse power electric motors and similar devices, that has the desirable features and characteristics of the structure shown in my said patent, but which is of slightly different construction. Some of the objects of my present invention are, to simplify the manufacture and reduce the cost of a finger grip or shield of the kind above mentioned; increase the rigidity of the finger grip or shield when it is in its extended position; and eliminate the possibility of an accumulation of rust, dirt or other foreign matter on the finger grip, or on parts with which it co-acts interfering with the rapid and easy movement of said finger grip into and out of its extended position.

To this end I have devised a structure of the general kind that constitutes the invention described in my said United States patent, but which is distinguished from the structure illustrated in said patent, in that the finger grip or shield, instead of being constructed in the form of a relatively long sleeve or tubular member slidingly mounted in a guideway or bearing in the front end portion of the motor housing, is constructed in the form of an extensible and retractible tubular member, which, when arranged in its extended position, is connected by screw threads to a supporting means carried by the motor housing. Preferably, said extensible and retractible member constitutes the terminal portion of the shield or finger grip that is grasped by the user's fingers, and the means on the motor housing that sustains said terminal member when in its extended position, consists of a tubular base piece mounted in the housing in such a way that it remains stationary when the terminal member is shifted into and out of its extended position, said base piece being of slightly greater diameter than the terminal member so that said terminal member can be telescoped into same when it is retracted to expose or uncover the jaw actuating device of the chuck. To shift said terminal member into its retracted position, the user first rotates said member relatively to the stationary tubular base piece, in a direction to disengage the co-acting threads on said parts, and thereafter, the terminal member is moved inwardly into the base piece into telescoped relation with the same. During this operation, i. e., shifting the terminal member inwardly into its retracted position, a part or parts on said terminal member will be rendered operative to hold the jaw carrying member of the chuck against rotary movement when the jaw actuating device is being manipulated to expand and contract the tool gripping jaws of the chuck. Due to the fact that the extensible and retractible finger grip or shield of my present structure is not dependent upon a sliding fit with a co-acting part to insure easy movement of same, the procedure of manufacturing the structure is simplified, and another advantage of said structure is that an accumulation of rust or other foreign matter on the parts of the structure will not interfere with the free and easy movement of the finger grip into and out of its extended position. Still another advantage is that the terminal member, when in its extended position, is perfectly rigid, due to the fact that it is joined by screw threads to the tubular base piece, which fits snugly in a bearing in the motor housing that is of sufficient length and diameter to eliminate the possibility of the base piece, or the terminal member carried by same, wobbling, flexing or moving sideways under the pressure exerted on the terminal member by the user's fingers.

Figure 1 of the drawing is a side elevational view, partly broken away, of a fractional horse power electric motor equipped with a tool chuck and finger grip constructed in accordance with my present invention.

Figure 2 is a longitudinal sectional view, taken on the line 2—2 of Figure 1.

Figure 3 is a longitudinal sectional view, taken on the line 3—3 of Figure 4.

Figure 4 is a cross sectional view, taken on the line 4—4 of Figure 3, looking in the direction indicated by the arrows; and Figure 5 is a perspective view of the terminal member.

In the accompanying drawing which illustrates the preferred form of my invention, A designates the housing of a fractional horse power electric motor, and B designates the armature shaft of the motor, said shaft being provided with a chuck that is adapted to carry a tool provided with a shank that is grasped by jaws in the chuck. Usually, the chuck will comprise a jaw supporting member C attached by a set screw 1 or equivalent means to the shaft B, a conventional spring collet D arranged inside of the jaw supporting member C and provided with expansible and contractible tool gripping jaws 2, and a nut or jaw actuating device E rotatably mounted on an externally threaded portion of the jaw carrying member for opening and closing the jaws 2. As shown in the drawings, the jaws 2 have inclined external surfaces that co-act with oppositely-inclined surfaces on the jaw supporting members C to close or contract the jaws when the collet D is moved inwardly or to the right, looking at Figure 2, by rotating the nut E in one direction. When said nut E is rotated in the opposite direction, the collet moves outwardly and the jaws 2 expand, due to the inherent resiliency of said jaws and to the co-action of the inclined surfaces on said jaws with the oppositely-inclined surfaces on the jaw-carrying member C. The nut E is preferably provided with radially-disposed holes 3, in any one of which a pin or other similar device y may be inserted, as shown in broken lines in Figure 3, so as to facilitate the turning of said nut, and there is a shoulder on the interior of said nut that bears against a shoulder on the collet, such as a shoulder formed by the front ends of the jaw 2, so as to move the collet in a direction to contract or close the jaws when the nut E is rotated in one direction. Turning the nut E in the opposite direction causes the jaws 2 to expand or open, and thus release the shank of the tool.

When the tool is in use all portions of the chuck, including the jaw actuating device E, are housed inside of a tubular structure whose front end portion constitutes a non-rotatable finger grip that is located in sufficiently close proximity to the tool carried by the chuck to insure accurate guiding and manipulation of said tool. In my present invention said shield or finger grip is preferably composed of two parts, to wit, an extension piece or terminal member F of tubular form, arranged so as to normally surround and encase the jaw actuating nut E, but capable of being retracted by movement into a position as to expose said nut, and a tubular base piece F' mounted in the front end portion of the motor housing A and adapted to serve as a support which holds the terminal member F perfectly rigid when said terminal member is in its extended position, as shown in Figure 2. The base piece F' fits snugly in a bearing or sleeve 4 in the housing A, and projects forwardly beyond the front end of said housing. The terminal member F is made slightly smaller in diameter than the base piece F', so that it can be retracted or moved inwardly into telescoped relation with said base piece when it is desired to actuate the nut E to clamp or release the tool carried by the chuck. Normally, the terminal member F is extended forwardly beyond the end of the base piece F', and when arranged in this position, said terminal member is held perfectly rigid by external screw threads 5 thereon that mesh with internal threads 6 in the front end portion of the base piece F'.

The base piece F' remains stationary, or at rest, in the housing A when the terminal member F is shifted back and forth from one position to the other, and accordingly, it is possible to provide a bearing for said base piece in the housing A that is of sufficient length and diameter to overcome any tendency of said base piece to wobble or deflect laterally when the apparatus is in use. This, coupled with the fact that the fact that the terminal member F is connected with the base piece F' by the co-acting screw threads 5 and 6, produces a finger grip in close proximity to the tool that is perfectly rigid. Such a structure is inexpensive to manufacture and easy to produce, as the rigidity of the finger grip is not dependent upon a close fit between two co-acting parts, one of which has a slide bearing on the other; and still another advantage of such a structure is that rust or dirt will not interfere with the free and easy movement of the terminal member F into and out of its extended positon. Rotary movement of said terminal member in one direction disengages it from the base piece F', and permits the terminal member to drop or move inwardly into the base piece, so as to expose the jaw actuating device of the chuck, and thereafter, when the terminal member F is shifted forwardly into its extended position, it is only necessary to mesh the threads 5 and 6 and then turn the terminal member F in a direction to draw the shoulder 5ª thereon into tight engagement with the shoulder 6ª on the base piece F', which operation arrests the forward movement of the terminal member and causes it to be located properly with respect to the jaw actuating device D of the chuck.

In order that the jaw carrying member C will not turn when the nut E is being rotated to expand or contract the tool gripping jaws 2, the terminal member F of the shield or finger grip is constructed so that when it is shifted into its retracted position, shown in Figure 3, a part or parts on said terminal member co-operate with devices on the jaw carrying member C and on the base piece F' to effectively hold the jaw carrying member against rotary movement when the nut E is turned on the threads of the jaw carrying member. In the form of my invention herein illustrated the terminal member F is provided at its inner end with a pair of longitudinally-disposed legs 7, as shown in Figure 5, disposed so that when the member F is shifted inwardly into its retracted position, shown in Figure 3, said legs 7 will lie between lugs or equivalent devices on the jaw carrying member C, and lugs or equivalent devices 9 on the base piece F', and thus in effect, act as keys that prevent the jaw carrying member from turning relatively to the base piece F', which, as previously stated, is mounted in the housing A. The lugs 8 on the jaw carrying member C project outwardly from the exterior of said member, and the lugs 9 on the stationary base piece F' project inwardly from the interior of said base piece, the lugs 8 being disposed in advance of the lugs 9, or, in other words, out of alignment with same, so as to not interfere with the rotation of the jaw carrying member C when the shiftable portion F of the finger grip is in its extended position. Normally, the finger grip F is set or adjusted in its extended position, shown in Figure 2, and at such times the legs 7 thereon are disposed in advance of the lugs 8 and 9 previously referred to. When, however, the terminal member F is retracted or moved inwardly into telescoped relation with the base piece F', as shown in Figure 3, the legs 7 assume such a position that if the jaw carrying member C starts to turn, the lugs 8 on said jaw carrying member strike against the legs 7 and move said legs laterally into engagement with the inwardly-projecting lugs 9 on the base piece F', thereby effectively holding the jaw carrying member against rotary movement. Preferably, the base piece F' is mounted in the motor housing in such a way that said base piece will normally remain at rest and will not turn or rotate relatively to the housing, but it is not absolutely necessary that the base piece F' be stationarily mounted or non-rotatably mounted in the housing A. For example, it would be entirely practicable to mount the base piece F' in the motor housing in such a way that it is capable of turning relatively to the housing, because there is a portion of the base piece that projects forwardly beyond the front end of the housing, and which is long enough to be grasped by the user's fingers, so as to manually hold the base piece F' at rest during the operation of turning the nut E to expand or contract the tool gripping jaws of the chuck. I prefer, however, to construct the portion of the base piece F' that fits in the bearing 4 in the motor housing in such a way that it frictionally grips said bearing 4, and form one or more notches 10 in the rear end portion of the base piece F', as shown in Figure 1, so as to receive stationary holding devices 11 on the interior of the bearing 4 that prevent the base piece F' from turning relatively to said bearing. When the device is constructed in this manner, shifting of the terminal member F into its retracted position, as previously explained, causes the legs 7 thereon to be disposed between or interlocked with non-rotatable lugs 9 carried by the motor housing, and lugs 8 on the jaw carrying member, in such a way that the user can hold the housing A in one hand and use his other hand to turn the nut E during the operation of installing or removing a tool.

Having thus described my invention, what I claim as new and desire to secure by Letters Patent is:

1. A fractional horse power electric motor or similar tool operating device, comprising a housing adapted to be grasped in the hand of the user, a drive shaft in said housing, a tool chuck on said shaft provided with a jaw-carrying member and with a jaw actuating device rotatably mounted on said member, a finger grip or shield comprising an extensible and retractible terminal member, which, when arranged in its extended position, constitutes a non-rotatable finger grip that surrounds or encases the jaw-actuating device of the chuck, a support for said terminal member carried by the housing and detachably connected to said terminal member by screw threads, and means rendered operative by movement of said terminal member into its retracted position, for holding said terminal member against rotary movement and for preventing said jaw carrying member from turning when the jaw actuating device thereon is manipulated.

2. A fractional horse power electric motor or similar tool operating device, comprising a housing adapted to be grasped in the hand of the user, a drive shaft in said housing, a tool chuck on said shaft provided with a jaw-carrying member and with a jaw actuating device rotatably mounted on said member, a finger grip or shield comprising a tubular base piece carried by the housing and an extensible and retractible terminal member detachably connected by screw threads to said base piece, said terminal member being adapted to be disconnected from said base piece and telescoped into same to expose the jaw actuating device of the chuck, and co-acting devices on said terminal member, base piece and jaw-carrying member that are disposed in interlocking relationship when said terminal member is in its retracted position, whereby said terminal member and said jaw carrying member will both be held against rotary movement.

3. A fractional horse power electric motor or similar tool operating device, comprising a housing adapted to be grasped in the hand of the user, a drive shaft in said housing, a tool chuck on said shaft provided with a jaw-carrying member and with a jaw actuating device rotatably mounted on said member, a finger grip or shield comprising a tubular base piece carried by the housing and an extensible and retractible terminal member detachably connected by screw threads to said base piece, said terminal member being adapted to be disconnected from said base piece and telescoped into same to expose the jaw actuating device of the chuck, an external lug or abutment on said jaw-carrying member, an internal lug or abutment on said base piece, said lugs being disposed out of alignment with each other, and a part on said terminal member that moves into operative relationship with said lugs to resist rotary movement of said terminal member and jaw-carrying member, when said terminal member is shifted into its retracted position.

4. A fractional horse power electric motor or similar tool operating device, comprising a housing adapted to be grasped in the hand of the user, a drive shaft in said housing, a tool chuck on said shaft provided with a jaw-carrying member and with a jaw actuating device rotatably mounted on said member, a tubular base piece firmly supported in a bearing in the front end portion of the housing, a tubular finger grip arranged in telescoped relation with said base piece and adapted to be moved into a position wherein it extends forwardly beyond said base piece, co-acting screw threads on said terminal member and base piece for joining said elements together when said terminal member is extended, legs disposed longitudinally of said terminal member and projecting rearwardly from the inner end of same, and parts on the base piece and on the jaw-carrying member that are adapted to co-operate with said legs to hold said terminal member and jaw-carrying member against rotary movement when said terminal member is in its retracted position.

LOYD SCRUGGS.